United States Patent
Li

(10) Patent No.: US 12,494,504 B2
(45) Date of Patent: Dec. 9, 2025

(54) ALL-SOLID-STATE BATTERY AND MANUFACTURING METHOD FOR ALL-SOLID-STATE BATTERY

(71) Applicant: TOYOTA JIDOSHA KABUSHIKI KAISHA, Toyota (JP)

(72) Inventor: Ximeng Li, Susono (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 706 days.

(21) Appl. No.: 17/848,767

(22) Filed: Jun. 24, 2022

(65) Prior Publication Data

US 2023/0016169 A1 Jan. 19, 2023

(30) Foreign Application Priority Data

Jul. 8, 2021 (JP) .................. 2021-113719

(51) Int. Cl.
*H01M 10/0562* (2010.01)
*H01M 4/02* (2006.01)
*H01M 4/38* (2006.01)
*H01M 10/058* (2010.01)

(52) U.S. Cl.
CPC ....... *H01M 10/0562* (2013.01); *H01M 4/382* (2013.01); *H01M 10/058* (2013.01); *H01M 2004/027* (2013.01); *H01M 2004/028* (2013.01)

(58) Field of Classification Search
CPC ............. H01M 10/0562; H01M 4/382; H01M 10/058; H01M 2004/027; H01M 2004/028; H01M 10/0585; H01M 4/38; H01M 10/056; H01M 2300/0085
See application file for complete search history.

(56) References Cited

U.S. PATENT DOCUMENTS

| | | |
|---|---|---|
| 2009/0011338 A1 | 1/2009 | Kimura |
| 2013/0143128 A1 | 6/2013 | Mochida et al. |
| 2014/0342209 A1* | 11/2014 | He ............... H01M 10/056 429/101 |
| 2015/0147659 A1 | 5/2015 | Kato |
| 2016/0380301 A1 | 12/2016 | Kosaka et al. |
| 2017/0133710 A1* | 5/2017 | Yoon .................. C08J 5/22 |
| 2019/0190064 A1 | 6/2019 | Fujiki et al. |
| 2021/0159486 A1* | 5/2021 | Chung ............. H01M 4/0435 |
| 2022/0399532 A1* | 12/2022 | Feng ............... H01M 10/052 |

FOREIGN PATENT DOCUMENTS

| | | |
|---|---|---|
| JP | 2004-206942 A | 7/2004 |
| JP | 2008-123954 A | 5/2008 |
| JP | 2022-082060 A | 6/2022 |
| KR | 10-2013-0108244 A | 10/2013 |
| WO | 2012/026480 A1 | 3/2012 |
| WO | 2014/010043 A1 | 1/2014 |

* cited by examiner

*Primary Examiner* — Nicholas A Smith
*Assistant Examiner* — Seamus Patrick McNulty
(74) *Attorney, Agent, or Firm* — Oliff PLC

(57) ABSTRACT

An all-solid-state cell, having improved short-circuit resistance, comprises a first electrode layer, a first solid electrolyte layer, a second solid electrolyte layer, and a second electrode layer in this order, wherein the first solid electrolyte layer has a first surface, the second solid electrolyte layer has a second surface in contact with the first surface, and a maximum height $Rz_1$ of the first surface and a maximum height $Rz_2$ of the second surface satisfy the following relation (1):

$$0.15 \leq Rz_1/Rz_2 \leq 0.25 \qquad (1)$$

2 Claims, 6 Drawing Sheets

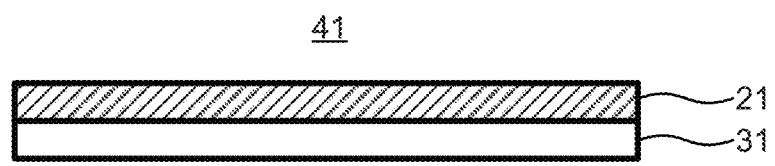
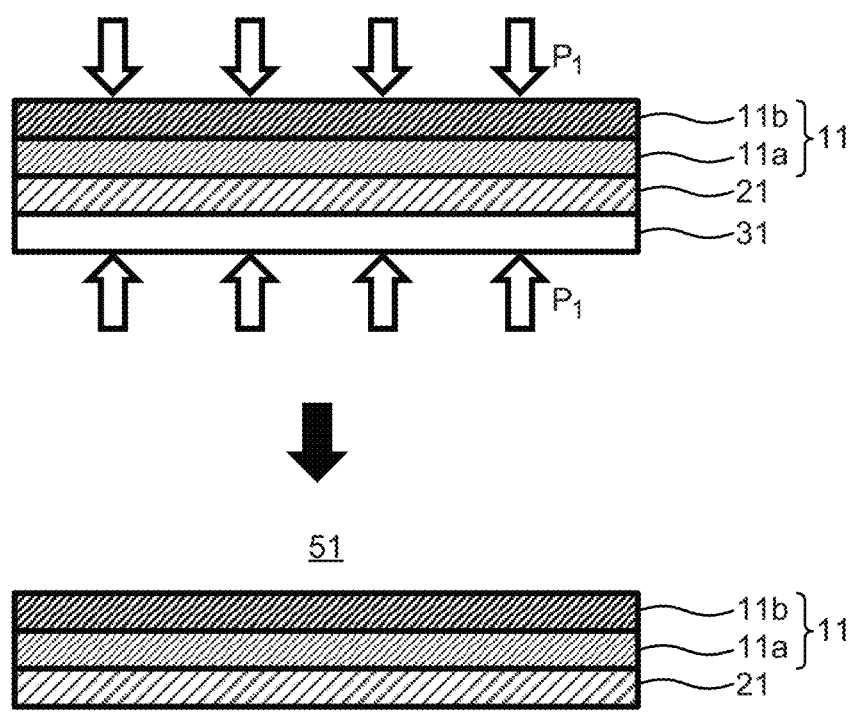

ALL-SOLID-STATE BATTERY AND MANUFACTURING METHOD FOR ALL-SOLID-STATE BATTERY

FIELD

The present application discloses an all-solid-state battery and a manufacturing method for an all-solid-state battery.

BACKGROUND

PTL 1 discloses a technique for reducing pinholes which penetrate between a positive electrode layer and a negative electrode layer of an all-solid-state battery by interposing two solid electrolyte layers between the positive electrode layer and the negative electrode layer. In addition, PTL 2 discloses a technique for improving the safety and reliability of an all-solid-state battery using metallic lithium as a negative electrode active material by interposing two or more types of solid electrolytes between the positive electrode layer and the negative electrode layer and adjusting the material and ionic conductivity of each solid electrolyte layer.

CITATION LIST

Patent Literature

[PTL 1] WO 2014/010043 A1
[PTL 2] JP 2004-206942 A

SUMMARY

Technical Problem

According to new findings of the present inventors, even when two solid electrolyte layers are interposed between the positive electrode layer and the negative electrode layer of an all-solid-state battery, there is a risk that if stress is applied to a solid electrolyte layer due to expansion or contraction of the active material during charging and discharging of the all-solid-state battery and cracks are generated in the solid electrolyte layer, the cracks may propagate from one solid electrolyte layer to the other solid electrolyte layer and cause a short circuit. In this regard, there is room for improvements in the prior art regarding the suppression of the propagation of cracks in the solid electrolyte layer to improve the short-circuit resistance of the all-solid-state battery.

Solution to Problem

As a means for solving the above problem, the present application discloses an all-solid-state battery, comprising a first electrode layer, a first solid electrolyte layer, a second solid electrolyte layer, and a second electrode layer in this order, wherein
the first solid electrolyte layer has a first surface,
the second solid electrolyte layer has a second surface in contact with the first surface, and
a maximum height $Rz_1$ of the first surface and a maximum height $Rz_2$ of the second surface satisfy a relation (1) below:

$$0.15 \leq Rz_1/Rz_2 \leq 0.25 \tag{1}$$

In the all-solid-state battery of the present disclosure,
the second solid electrolyte layer may have a third surface on an opposite side of the second surface,
the second electrode layer may have a fourth surface in contact with the third surface, and
a maximum height $Rz_3$ of the third surface and a maximum height $Rz_4$ of the fourth surface may satisfy a relation (2) or (3) below:

$$0.45 \leq Rz_3/Rz_4 \leq 1.00 \tag{2}$$

$$0.45 \leq Rz_4/Rz_3 \leq 1.00 \tag{3}$$

In the all-solid-state battery of the present disclosure,
the first electrode layer may comprise a positive electrode active material layer, and
the second electrode layer may comprise a negative electrode active material layer.
In the all-solid-state battery of the present disclosure,
the negative electrode active material layer may contain metallic lithium as a negative electrode active material.
In the all-solid-state battery of the present disclosure,
the positive electrode active material layer may contain sulfur as a positive electrode active material.

As a means for solving the above problem, the present application discloses a manufacturing method for an all-solid-state battery, comprising:
forming a first solid electrolyte layer on a surface of a substrate to obtain a transfer material;
laminating the transfer material and a first electrode layer together, then applying a pressure $P_1$ in a laminating direction, and transferring the first solid electrolyte layer on the transfer material to the first electrode layer to obtain a first laminate comprising the first electrode layer and the first solid electrolyte layer;
coating a second electrode layer with a material constituting a second solid electrolyte layer to obtain a second laminate comprising the second electrode layer and the second solid electrolyte layer; and
laminating the first laminate and the second laminate together and then applying a pressure $P_2$ smaller than the pressure $P_1$ in a laminating direction to obtain an all-solid-state battery comprising the first electrode layer, the first solid electrolyte layer, the second solid electrolyte layer, and the second electrode layer in this order.

In the manufacturing method of the present disclosure,
the first electrode layer may comprise a positive electrode active material layer, and
the second electrode layer may comprise a negative electrode active material layer.
In the manufacturing method of the present disclosure,
the negative electrode active material layer may contain metallic lithium as a negative electrode active material.
In the manufacturing method of the present disclosure,
the positive electrode active material layer may contain sulfur as a positive electrode active material.

Advantageous Effects

In the all-solid-state battery of the present disclosure, even when cracks are generated in one of the first solid electrolyte layer and the second solid electrolyte layer, the propagation of cracks to the other layer is easily suppressed, and excellent short-circuit resistance is easily ensured.

BRIEF DESCRIPTION OF DRAWINGS

FIG. 5A schematically shows a configuration of the transfer material obtained by step S1.

FIG. 5B schematically shows the flow of step S2 and a configuration of the first laminate obtained by the step S2.

DESCRIPTION OF EMBODIMENTS

1. All-Solid-State Battery

Figure 1:
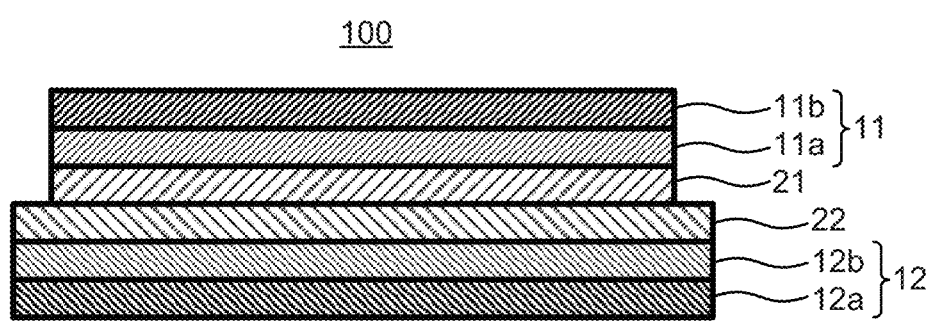
FIG. 1 schematically shows a configuration of the all-solid-state battery 100.
Figure 2:
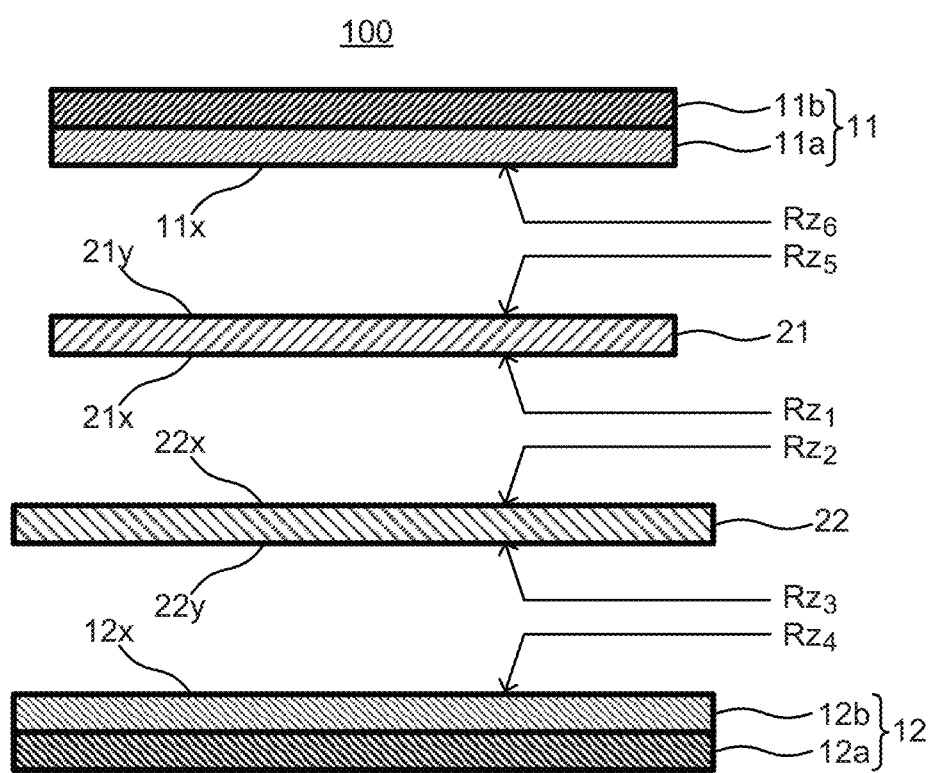
FIG. 2 schematically shows a disassembled configuration of the all-solid-state battery 100.

As shown in FIGS. 1 and 2, the all-solid-state battery 100 according to one embodiment comprises a first electrode layer 11, a first solid electrolyte layer 21, a second solid electrolyte layer 22, and a second electrode layer 12 in this order. As shown in FIG. 2, the first solid electrolyte layer 21 has a first surface 21x, and the second solid electrolyte layer 22 has a second surface 22x that is in contact with the first surface 21x. In addition, a maximum height $Rz_1$ of the first surface 21x and a maximum height $Rz_2$ of the second surface 22x satisfy the following relation (1):

$$0.15 \leq Rz_1/Rz_2 \leq 0.25 \quad (1)$$

1.1 First Electrode Layer

As shown in FIGS. 1 and 2, the first electrode layer 11 may comprise an active material layer 11a and a current collector layer 11b. The first electrode layer 11 may be a positive electrode layer or a negative electrode layer. A superior effect can be expected particularly in the case of a positive electrode layer. That is, the first electrode layer 11 may comprise a positive electrode active material layer 11a, and may further comprise a positive current collector layer 11b.

1.1.1 Positive Electrode Active Material Layer

The positive electrode active material layer 11a contains at least a positive electrode active material. The positive electrode active material layer 11a may optionally contain a solid electrolyte, a binder, a conductive aid and etc., in addition to the positive electrode active material.

A known positive electrode active material for an all-solid-state battery may be used as the positive electrode active material. Of the known active materials, two materials having different potentials (charge/discharge potentials) for storing and releasing predetermined ions are selected, and the material exhibiting an electropositive potential and the material exhibiting an electronegative potential can be used as the positive electrode active material and the negative electrode active material, respectively. For example, when configuring a lithium-ion battery, various lithium-containing composite oxides, such as lithium cobalt oxide, lithium nickel oxide, $LiNi_{1/3}Co_{1/3}Mn_{1/3}O_2$, lithium manganese oxide, and spinel-based lithium compounds; and sulfur or sulfur compounds can be used as the positive electrode active material. One type of the positive electrode active material may be used alone, or two or more may be used as a mixture. Particularly, when the positive electrode active material layer 11a contains sulfur as the positive electrode active material, a more superior effect can be expected. It is considered that sulfur as a positive electrode active material has a large amount of expansion and contraction during charging and discharging, stress accompanying the expansion and contraction easily accumulates between the positive electrode active material layer and the solid electrolyte layer, and the stress is not relieved, whereby cracks are easily generated in the solid electrolyte layer. In contrast, according to the technique of the present disclosure, the propagation of cracks generated in the solid electrolyte layer is suppressed, and the short-circuit resistance of the all-solid-state battery is easily improved. On the surface of the positive electrode active material, in order to suppress a reaction due to contact between the positive electrode active material and the solid electrolyte, a covering layer such as a lithium niobate layer, a lithium titanate layer, or a lithium phosphate layer may be provided. The positive electrode active material may be, for example, particulate, and the size thereof is not particularly limited. The particles of the positive electrode active material may be solid particles or hollow particles. The particles of the positive electrode active material may be primary particles or secondary particles of a plurality of agglomerated primary particles. The average particle diameter of the particles of the positive electrode active material may be, for example, 1 nm or more, 5 nm or more, or 10 nm or more, and may be 500 μm or less, 100 μm or less, 50 μm or less, or 30 μm or less. Note that, the average particle diameter referred herein is a particle diameter (median diameter, D50) at an integrated value of 50% in a volume-based particle size distribution determined by a laser diffraction/scattering method.

A known solid electrolyte for an all-solid-state cell may be used as the solid electrolyte that can be contained in the positive electrode active material layer 11a. The solid electrolyte may be an inorganic solid electrolyte or an organic polymer electrolyte. Particularly, an inorganic solid electrolyte has high ionic conductivity compared to an organic polymer electrolyte, and has excellent heat resistance compared to an organic polymer electrolyte. Examples of the inorganic solid electrolyte include oxide solid electrolytes such as lithium lanthanum zirconate, LiPON, $Li_{1+x}Al_xGe_{2-x}(PO_4)_3$, Li—SiO-based glass, and Li—Al—S—O-based glass; and sulfide solid electrolytes such as $Li_2S$, $P_2S_5$, $Li_2S$—$P_2S_5$, $Li_2S$—$SiS_2$, $LiI$—$Li_2S$—$SiS_2$, $LiI$—$Si_2S$—$P_2S_5$, $Li_2S$—$P_2S_5$—$LiI$—$LiBr$, $LiI$—$Li_2S$—$P_2S_5$, $LiI$—$Li_2S$—$P_2O_5$, $LiI$—$Li_3PO_4$—$P_2S_5$, and $Li_2S$—$P_2S_5$—$GeS_2$. Particularly, a sulfide solid electrolyte has excellent performance. The solid electrolyte may be amorphous or crystalline. One type of the solid electrolyte may be used alone, or two or more may be used as a mixture. The solid electrolyte that can be contained in the positive electrode active material layer 11a may be particulate. The particles of the solid electrolyte may be primary particles or secondary particles of a plurality of agglomerated primary particles. The average particle diameter of the solid electrolyte may be, for example, 10 nm or more, 0.1 μm or more, 0.5 μm or more, or 1 μm or more, and may be 100 μm or less, 50 μm or less, 10 μm or less, or 5 μm or less.

The binder that can be contained in the positive electrode active material layer 11a may be, for example, at least one selected from a butadiene rubber (BR)-based binder, a butylene rubber (IIR)-based binder, an acrylate butadiene rubber (ABR)-based binder, a styrene butadiene rubber (SBR)-based binder, a polyvinylidene fluoride (PVdF)-based binder, and a polytetrafluoroethylene (PTFE)-based binder.

The conductive aid that can be contained in the positive electrode active material layer 11a may be, for example, at least one selected from carbon materials, such as acetylene black and Ketjen black, and metallic materials, such as nickel, aluminum, and stainless steel. The conductive aid may be, for example, particulate or fibrous, and the size thereof is not particularly limited.

The content of each component of the positive electrode active material layer 11a may be the same as in the prior art. The positive electrode active material layer 11a may contain, for example, 10% by mass or greater and 90% by mass or less of the positive electrode active material, 0% by mass or greater and 60% by mass or less of the solid electrolyte, 0% by mass or greater and 30% by mass or less of the conductive aid, and optionally the binder as the balance. The shape of the positive electrode active material layer 11a may also be the same as in the prior art. From the viewpoint of being able to easily configure the all-solid-state battery 100, the positive electrode active material layer 11a may be sheet-like. The thickness of the positive electrode active material layer 11a is not particularly limited, but may be, for example, 0.1 μm or more and 2 mm or less. The lower limit may be 1 μm or more, and the upper limit may be 1 mm or less.

1.1.2 Positive Current Collector Layer

Any general current collector layer for an all-solid-state battery can be adopted as the positive current collector layer 11b. The positive current collector layer 11b may be composed of a metal foil or a metal mesh. Particularly, a metal foil has excellent handleability. The positive current collector layer 11b may be formed of a plurality of metal foils. Examples of a metal constituting the positive current collector layer 11b include Cu, Ni, Cr, Au, Pt, Ag, Al, Fe, Ti, Zn, Co, and stainless steel. Particularly, from the viewpoint of ensuring oxidation resistance, the positive current collector layer 11b may contain Al. The positive current collector layer 11b may have some coating layer on a surface thereof for the purpose of adjusting resistance. In addition, when the positive current collector layer 11b is formed of a plurality of metal foils, the plurality of metal foils may have some layer therebetween. The thickness of the positive current collector layer 11b is not particularly limited, but may be, for example, 0.1 μm or more or 1 μm or more, and 1 mm or less or 100 μm or less.

1.2 First Solid Electrolyte Layer

As shown in FIGS. 1 and 2, the first solid electrolyte layer 21 is disposed between the first electrode layer 11 and the second solid electrolyte layer 22, and may be in contact with both. That is, the first solid electrolyte layer 21 may have a first surface 21x in contact with the second solid electrolyte layer 22, and may have a fifth surface 21y in contact with the first electrode layer 11.

The first solid electrolyte layer 21 contains at least a solid electrolyte. The first solid electrolyte layer 21 may contain a binder and etc. in addition to the solid electrolyte.

The solid electrolyte contained in the first solid electrolyte layer 21 may be the same as or different from the solid electrolyte that can be contained in the positive electrode active material layer 11a. The solid electrolyte may be the above inorganic solid electrolyte. Particularly, the above sulfide solid electrolyte has excellent performance. The solid electrolyte may be amorphous or crystalline. One type of the solid electrolyte may be used alone, or two or more may be used as a mixture. The solid electrolyte contained in the first solid electrolyte layer 21 may be particulate. The average particle diameter of the solid electrolyte may be, for example, 10 nm or more, 0.1 μm or more, 0.5 μm or more, or 1 μm or more, and may be 100 μm or less, 50 μm or less, 10 μm or less, or 5 μm or less.

The binder that can be contained in the first solid electrolyte layer 21 may be the same as or different from the binder that can be contained in the above positive electrode active material layer 11a, and may be at least one selected from, for example, a butadiene rubber (BR)-based binder, a butylene rubber (IIR)-based binder, an acrylate butadiene rubber (ABR)-based binder, a styrene butadiene rubber (SBR)-based binder, a polyvinylidene fluoride (PVdF)-based binder, and a polytetrafluoroethylene (PTFE)-based binder.

The contents of the solid electrolyte and the binder in the first solid electrolyte layer 21 are not particularly limited. The first solid electrolyte layer 21 may contain, for example, 80% by mass or greater or 90% by mass or greater of the solid electrolyte and 20% by mass or less or 10% by mass or less of the binder. Particularly, when the first solid electrolyte layer 21 contains the binder in an amount of 0.6% by mass or greater and 10% by mass or less, high performance is easily ensured. The first solid electrolyte layer 21 may be, for example, sheet-like. The thickness of the first solid electrolyte layer 21 is not particularly limited, but may be, for example, 0.1 μm or more and 2 mm or less. The lower limit may be 1 μm or more, and the upper limit may be 1 mm or less. The first solid electrolyte layer 21 may be thicker or thinner than the second solid electrolyte layer 22 described later. It is considered that thicker one is more effective.

1.3 Second Solid Electrolyte Layer

As shown in FIGS. 1 and 2, the second solid electrolyte layer 22 is disposed between the first solid electrolyte layer 21 and the second electrode layer 12, and may be in contact with both. That is, the second solid electrolyte layer 22 may have a second surface 22x in contact with the first solid electrolyte layer 21, and may have a third surface 22y in contact with the second electrode layer 12.

The second solid electrolyte layer 22 contains at least a solid electrolyte. The second solid electrolyte layer 22 may contain a binder and etc. in addition to the solid electrolyte.

The solid electrolyte contained in the second solid electrolyte layer 22 may be the same as or different from the solid electrolyte that can be contained in the positive electrode active material layer 11a or the first solid electrolyte layer 21 above. Particularly, it is preferable that the same solid electrolyte as the one contained in the first solid electrolyte layer 21 be used. The solid electrolyte may be the above inorganic solid electrolyte. Particularly, the above sulfide solid electrolyte has excellent performance. The solid electrolyte may be amorphous or crystalline. One type of the solid electrolyte may be used alone, or two or more may be used as a mixture. The solid electrolyte contained in the second solid electrolyte layer 22 may be particulate. The average particle diameter of the solid electrolyte may be, for example, 10 nm or more, 0.1 μm or more, 0.5 μm or more, or 1 μm or more, and may be 100 μm or less, 50 μm or less, 10 μm or less, or 5 μm or less. The solid electrolyte contained in the first solid electrolyte layer 21 and the electrolyte contained in the second solid electrolyte layer 22 may have substantially the same particle diameter. For example, the ratio $D_1/D_2$ between the average particle diameter $D_1$ of the solid electrolyte contained in the first solid electrolyte layer 21 and the average particle diameter $D_2$ of the solid electrolyte contained in the second solid electrolyte layer 22 may be 0.5 or greater, 0.7 or greater, or 0.9 or greater, and may be 1.5 or less, 1.3 or less, or 1.1 or less.

The binder that can be contained in the second solid electrolyte layer 22 may be the same as or different from the binder that can be contained in the positive electrode active material layer 11a or the first solid electrolyte layer 21 above, and may be at least one selected from, for example, a butadiene rubber (BR)-based binder, a butylene rubber (IIR)-based binder, an acrylate butadiene rubber (ABR)-based binder, a styrene butadiene rubber (SBR)-based binder, a polyvinylidene fluoride (PVdF)-based binder, and a polytetrafluoroethylene (PTFE)-based binder.

The contents of the solid electrolyte and the binder in the second solid electrolyte layer 22 are not particularly limited. The second solid electrolyte layer 22 may contain, for example, 80% by mass or greater or 90% by mass or greater of the solid electrolyte and 20% by mass or less or 10% by mass or less of the binder. Particularly, when the second solid electrolyte layer 22 contains the binder in an amount of 0.6% by mass or greater and 10% by mass or less, high performance is easily ensured. The second solid electrolyte layer 22 may be, for example, sheet-like. The thickness of the second solid electrolyte layer 22 is not particularly limited, but may be, for example, 0.1 μm or more and 2 mm or less. The lower limit may be 1 μm or more, and the upper limit may be 1 mm or less. The second solid electrolyte layer 22 may be thicker or thinner than the first solid electrolyte layer 21 described above. It is considered that thinner one is more effective. In addition, in the all-solid-state battery 100, the area of the surface 22x or 22y of the second solid electrolyte layer 22 may be larger than the area of the surface 11x of the first electrode layer 11 or may be larger than the area of the surface 21x or 21y of the first solid electrolyte layer 21, as shown in FIGS. 1 and 2.

1.4 Second Electrode Layer

As shown in FIGS. 1 and 2, the second electrode layer 12 may comprise an active material layer 12a and a current collector layer 12b. The second electrode layer 12 may be a positive electrode layer or a negative electrode layer. A superior effect can be expected particularly in the case of a negative electrode layer. That is, the second electrode layer 12 may comprise a negative electrode active material layer 12a, and may further comprise a negative current collector layer 12b.

1.4.1 Negative Electrode Active Material Layer

The negative electrode active material layer 12a contains at least a negative electrode active material. The negative electrode active material layer 12a may optionally contain a solid electrolyte, a binder, a conductive aid and etc., in addition to the negative electrode active material.

A known active material may be used as the negative electrode active material. For example, when constituting a lithium-ion battery, silicon-based active materials such as Si, Si alloys, and silicon oxides; carbon-based active materials such as graphite or hard carbon; various oxide-based active materials such as lithium titanate; and metallic lithium (pure lithium or a lithium alloy) can be used. The metallic lithium as the negative electrode active material is softer compared to other active materials. So, when a high pressure is applied to bring the metallic lithium and the second solid electrolyte layer 22 into close contact with each other, there is a risk of the metallic lithium entering the gaps in the second solid electrolyte layer 22 and reaching the positive electrode side. In addition, it is difficult to transfer the second solid electrolyte layer 22 to the surface of the soft metallic lithium. In the technique of the present disclosure, by adopting the manufacturing method as described later, it is easy to properly bring the negative electrode active material layer 12a and the second solid electrolyte layer 22 into close contact with each other and ionic conduction paths are easily secured at the interface between the negative electrode active material layer 12a and the second solid electrolyte layer 22, even when the negative electrode active material layer 12a contains metallic lithium as the negative electrode active material. Consequently, the growth of dendrites caused by poor contact during charging and discharging of the battery is easily suppressed. The negative electrode active material may be, for example, particulate, or may be foil-like as described later.

The solid electrolyte, the binder, and the conductive aid that can be contained in the negative electrode active material layer 12a can be appropriately selected and used from ones exemplified as those that can be contained in the positive electrode active material layer 11a.

The content of each component of the negative electrode active material layer 12a may be the same as in the prior art. The negative electrode active material layer 12a may contain, for example, 10% by mass or greater and 100% by mass or less of the negative electrode active material, 0% by mass or greater and 60% by mass or less of the solid electrolyte, 0% by mass or greater and 30% by mass or less of the conductive aid, and optionally the binder as the balance. The shape of the negative electrode active material layer 12a may also be the same as in the prior art. From the viewpoint of being able to easily configure the all-solid-state battery 100, the negative electrode active material layer 12a may be sheet-like. The thickness of the negative electrode active material layer 12a is not particularly limited, but may be, for example, 0.1 μm or more and 2 mm or less. The lower limit may be 1 μm or more, and the upper limit may be 1 mm or less. In the all-solid-state battery 100, a layer composed of metallic lithium (for example, a metallic lithium foil) may be used as the negative electrode active material layer 12a. In addition, in the all-solid-state battery 100, the area of the surface 12x of the second electrode layer 12 may be larger than the area of the surface 11x of the first electrode layer 11 or may be larger than the area of the surface 21x or 21y of the first solid electrolyte layer 21, as shown in FIGS. 1 and 2.

1.4.2 Negative Current Collector Layer

Any general current collector layer for an all-solid-state battery can be adopted as the negative current collector layer 12b. The negative current collector layer 12b may be composed of a metal foil or a metal mesh or composed of a carbon sheet. Particularly, a metal foil or a carbon sheet has excellent handleability. The negative current collector layer 12b may be formed of a plurality of metal foils or carbon sheets. Examples of a metal constituting the negative current collector layer 12b include Cu, Ni, Cr, Au, Pt, Ag, Al, Fe, Ti, Zn, Co, and stainless steel. Particularly, from the viewpoint of ensuring reduction resistance and the viewpoint of inhibiting alloying with lithium, the negative current collector layer 12b may contain at least one metal selected from Cu, Ni, and stainless steel or may be formed of a carbon sheet. The negative current collector layer 12b may have some coating layer on a surface thereof for the purpose of adjusting resistance. In addition, when the negative current collector layer 12b is formed of a plurality of metal foils, the plurality of metal foils may have some layer therebetween. The thickness of the negative current collector layer 12b is not particularly limited, but may be, for example, 0.1 μm or more or 1 μm or more, and 1 mm or less or 100 μm or less.

1.5 Relationship of Surface Roughness

As shown in FIG. 2, the first electrode layer 11 may have a sixth surface 11x in contact with the first solid electrolyte layer 21. In addition, the first solid electrolyte layer 21 may have a first surface 21x in contact with the second solid electrolyte layer 22 and may have a fifth surface 21y in contact with the sixth surface 11x of the first electrode layer 11. Further, the second solid electrolyte layer 22 may have a second surface 22x in contact with the first surface 21x of the first solid electrolyte layer 21 and may have a third surface 22y in contact with the second electrode layer 12. Furthermore, the second electrode layer 12 may have a fourth surface 12x in contact with the third surface 22y of the second solid electrolyte layer 22. Each surface may have a predetermined surface roughness. Hereinafter, the relationship of each surface roughness will be described.

1.5.1 Relationship at Interface Between First Solid Electrolyte Layer and Second Solid Electrolyte Layer In the all-solid-state battery 100, it is important that the maximum height $Rz_1$ of the first surface 21x and the maximum height $Rz_2$ of the second surface 22x satisfy the above relation (1). That is, a ratio $Rz_1/Rz_2$ is 0.15 or greater and 0.25 or less. The ratio $Rz_1/Rz_2$ is considered to express the state of contact between the first solid electrolyte layer 21 and the second solid electrolyte layer 22. According to new findings of the present inventor, when the ratio $Rz_1/Rz_2$ is excessively small, the difference in surface roughness between the first solid electrolyte layer 21 and the second solid electrolyte layer 22 is excessively large. Thus, a large number of voids or gaps are likely to form between the first solid electrolyte layer 21 and the second solid electrolyte layer 22, and it is difficult to secure sufficient ionic conduction paths between the first solid electrolyte layer 21 and the second solid electrolyte layer 22. On the other hand, when the ratio $Rz_1/Rz_2$ is near 1.00, the unevenness of the surface of the first solid electrolyte layer 21 and the unevenness of the surface of the second solid electrolyte layer 22 are engaged with each other, and the contact area between the first solid electrolyte layer 21 and the second solid electrolyte layer 22 is large. In this case, although ionic conduction paths are easily secured, the first solid electrolyte layer 21 and the second solid electrolyte layer 22 easily conform to each other. Thus, when cracks are generated in one of the first solid electrolyte layer 21 and the second solid electrolyte layer 22, cracks are also easily generated in the other layer, and cracks generated in one layer easily propagate to the other layer. As a result, it is difficult to improve the short-circuit resistance of the all-solid-state battery. In contrast, as described above, when the ratio $Rz_1/Rz_2$ is 0.15 or greater and 0.25 or less, the necessary ionic conduction paths between the first solid electrolyte layer 21 and the second solid electrolyte layer 22 are secured, and since the first solid electrolyte layer 21 and the second solid electrolyte layer 22 are not brought into excessively close contact with each other, the propagation of cracks from one layer to the other layer can be suppressed.

The specific value of the maximum height $Rz_1$ of the first surface 21x of the first solid electrolyte layer 21 in the all-solid-state battery 100 is not particularly limited, but may be, for example, 0.1 μm or more, 0.2 μm or more, or 0.3 μm or more, and may be 3.0 μm or less, 2.0 μm or less, 1.0 μm or less, 0.9 μm or less, 0.8 μm or less, or 0.7 μm or less. The specific value of the maximum height $Rz_2$ of the second surface 22x of the second solid electrolyte layer 22 in the all-solid-state battery 100 is not particularly limited, but may be, for example, 0.5 μm or more, 0.8 μm or more, 1.0 μm or more, or 1.5 μm or more, and may be 5.0 μm or less, 4.0 μm or less, 3.0 μm or less, or 2.0 μm or less.

1.5.2 Relationship at Interface Between Second Solid Electrolyte Layer and Second Electrode Layer In the all-solid-state battery 100, the second solid electrolyte layer 22 may have a third surface 22y on the opposite side of the second surface 22x, and the second electrode layer 12 may have a fourth surface 12x in contact with the third surface 22y. In this case, the maximum height $Rz_3$ of the third surface 22y and the maximum height $Rz_4$ of the fourth surface 12x may satisfy the following relation (2) or (3).

$$0.45 \leq Rz_3/Rz_4 \leq 1.00 \quad (2)$$

$$0.45 \leq Rz_4/Rz_3 \leq 1.00 \quad (3)$$

When the above ratio $Rz_3/Rz_4$ or $Rz_4/Rz_3$ is 0.45 or greater, the unevenness of the surface of the second solid electrolyte layer 22 and the unevenness of the surface of the second electrode layer 12 are engaged with each other, and the contact area between the second solid electrolyte layer 22 and the second electrode layer 12 can be increased. Consequently, the ionic conduction paths between the second solid electrolyte layer 22 and the second electrode layer 12 are easily secured. Note that, it is not necessary to suppress the propagation of cracks between the second solid electrolyte layer 22 and the second electrode layer 12. Even when cracks propagate from the second electrode layer 12 to the second solid electrolyte layer 22, since the propagation of cracks from the second solid electrolyte layer 22 to the first solid electrolyte layer 21 is suppressed as described above, sufficient short-circuit resistance in the all-solid-state battery 100 can be ensured. The upper limit of the ratio $Rz_3/Rz_4$ or $Rz_4/Rz_3$ is not particularly limited, but may be 1.00 or less as described above, or may be 0.90 or less, 0.80 or less, 0.70 or less, 0.60 or less, or 0.50 or less.

The specific value of the maximum height $Rz_3$ of the third surface 22y of the second solid electrolyte layer 22 in the all-solid-state battery 100 is not particularly limited, but may be, for example, 0.1 μm or more, 0.3 μm or more, 0.5 μm or more, 0.8 μm or more, or 1.0 μm or more, and may be 5.0 μm or less, 4.0 μm or less, 3.0 μm or less, or 2.0 μm or less. The specific value of the maximum height $Rz_4$ of the fourth surface 12x of the second electrode layer 12 is not particularly limited, but may be, for example, 0.1 μm or more, 0.3 μm or more, 0.5 μm or more, 0.8 μm or more, or 1.0 μm or more, and may be 5.0 μm or less, 4.0 μm or less, 3.0 μm or less, or 2.0 μm or less.

1.5.3 Relationship at Interface Between First Solid Electrolyte Layer and First Electrode Layer In the all-solid-state battery 100, the first solid electrolyte layer 21 may have a fifth surface 21y on the opposite side of the first surface 21x, and the first electrode layer 11 may have a sixth surface 11x in contact with the fifth surface 21y. In this case, the maximum height $Rz_5$ of the fifth surface 21y and the maximum height $Rz_6$ of the sixth surface 11x may satisfy the following relation (4) or (5). Consequently, the unevenness of the surface of the first solid electrolyte layer 21 and the unevenness of the surface of the first electrode layer 11 are engaged with each other, the contact area between the first solid electrolyte layer 21 and the first electrode layer 11 can be increased, and ionic conduction paths between the first solid electrolyte layer 21 and the first electrode layer 11 can be easily secured.

$$0.45 \leq Rz_5/Rz_6 \leq 1.00 \quad (4)$$

$$0.45 \leq Rz_6/Rz_5 \leq 1.00 \quad (5)$$

1.5.4 Measurement Method of Maximum Height Rz

Figure 3:
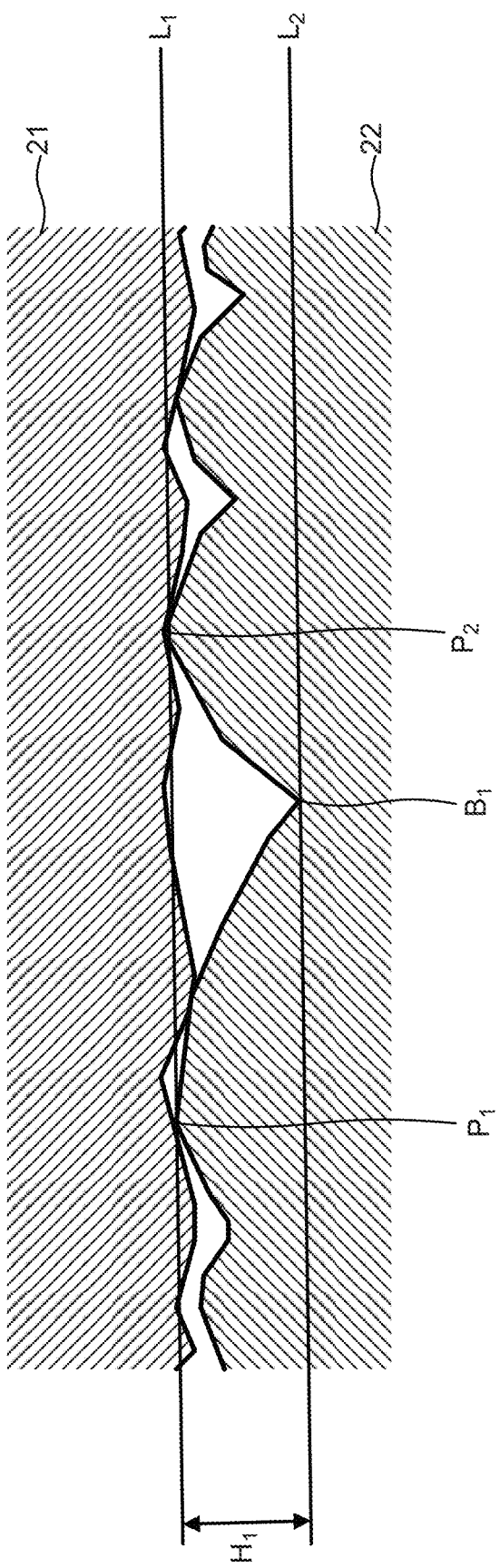
FIG. 3 schematically shows the measurement method of the maximum height Rz of a surface of a solid electrolyte layer.

In the present application, the maximum height Rz of the surface of each layer can be defined by SEM observation of the cross-section of the all-solid-state battery. For example, as shown in FIG. 3, a cross-section near the interface between the first solid electrolyte layer 21 and the second solid electrolyte layer 22 of the all-solid-state battery 100 is observed by SEM, and a two-dimensional image of the cross-section is acquired. The two-dimensional image comprises five or more convex portions on the surface of each of the first solid electrolyte layer 21 and the second solid electrolyte layer 22. Of the convex portions, two peaks P1 and P2 are specified, and a straight line L1 connecting the P1 and P2 is drawn. It is then confirmed that there is no convex portion having a height exceeding P1 and P2 on the extended line of the straight line L1 (convex portion protruding from the straight line L1). Then, assuming a parallel line L2 of the straight line L1, a bottom point B1 of the deepest concave portion of the surface of the solid electrolyte layer is intersected with the parallel line L2. It is then confirmed that there is no concave portion having a depth exceeding B1 on the extended line of the parallel line L2 (concave portion deeper than the position of the parallel line L2). The distance H1 between the straight line L1 and the parallel line L2 is set as the maximum height Rz.

Alternatively, the surface of each layer is exposed by peeling off each layer from the all-solid-state battery, and then Rz may be measured for the exposed surface in accordance with JIS B0601:2001. Alternatively, the surface of each layer is exposed; then, the unevenness of the surface is molded with a resin; Rz may be measured for the resin, to which the same unevenness as the surface is substantially transferred, in accordance with JIS B0601:2001, and this may be considered as Rz of the surface of each layer. In this case, Rz can be determined for a sample cut into a size of 10 mm×10 mm under the measurement conditions of a measurement length of 8 mm and a cut-off value of 0.5 mm, using an SE-600 manufactured by Kosaka Laboratory Ltd. Of the Rz measured by image analysis described above and the Rz measured according to the JIS standard, either one may satisfy the above relations.

1.5.5 Supplementary on Surface Roughness

In the all-solid-state battery, on a surface A of one of the electrode layers, unevenness is formed substantially uniformly over the entire surface A. Further, on a surface B of one of the solid electrolyte layers, unevenness is formed substantially uniformly over the entire surface B. In other words, the maximum height Rz of the surface of each layer substantially correlates with the arithmetic mean roughness Ra of the surface of each layer. That is, it is considered that the state of unevenness over the entire surface of each layer can be expressed by defining the maximum height Rz of the surface of each layer.

In the all-solid-state battery 100, the ratios and specific values of the arithmetic mean roughness Ra of the surfaces 11x, 12x, 21x, 21y, 22x, and 22y of the corresponding layers 11, 12, 21, and 22 are not particularly limited. For example, in a relationship with the above Rz, a ratio Ra/Rz may be 0.1 or greater and 0.2 or less.

1.6 Other Components

The all-solid-state battery 100 may comprise at least the layers described above, and may also comprise additional components. The components described hereinafter are examples of other members which can be contained in the all-solid-state battery 100.

1.6.1 Outer Packaging

In the all-solid-state battery 100, each of the above layers may be housed inside an outer packaging. More specifically, a portion excluding a tab or a terminal for extracting power from the all-solid-state battery 100 to an external portion may be housed inside the outer packaging. Any known outer packaging for a battery can be adopted as the outer packaging. For example, a laminate film may be used as the outer packaging. In addition, a plurality of all-solid-state batteries 100 may be electrically connected and optionally stacked to form a battery pack (assembled battery). In this case, the battery pack may be housed inside a known battery case.

1.6.2 Sealing Resin

In the all-solid-state battery 100, each of the above layers may be sealed with a resin. For example, at least a side surface (a surface along a laminating direction) of the laminate composed of each of the layers may be sealed with the resin. Consequently, contamination of the internal portion of each layer by moisture is easily suppressed. A known thermosetting or thermoplastic resin can be adopted as the sealing resin.

1.6.3 Restraining Member

The all-solid-state battery 100 may comprise a restraining member for restraining each layer in a laminating direction. By applying a restraining pressure to each layer in a laminating direction with the restraining member, the internal resistance of each layer is likely reduced. The restraining pressure in this case is usually smaller than the pressure $P_1$ or the pressure $P_2$ described later, and may be, for example, 50 MPa or less, 30 MPa or less, or 10 MPa or less, and may be 0.1 MPa or more or 1.0 MPa or more.

2. Manufacturing Method of All-Solid-State Battery

Figure 5C:
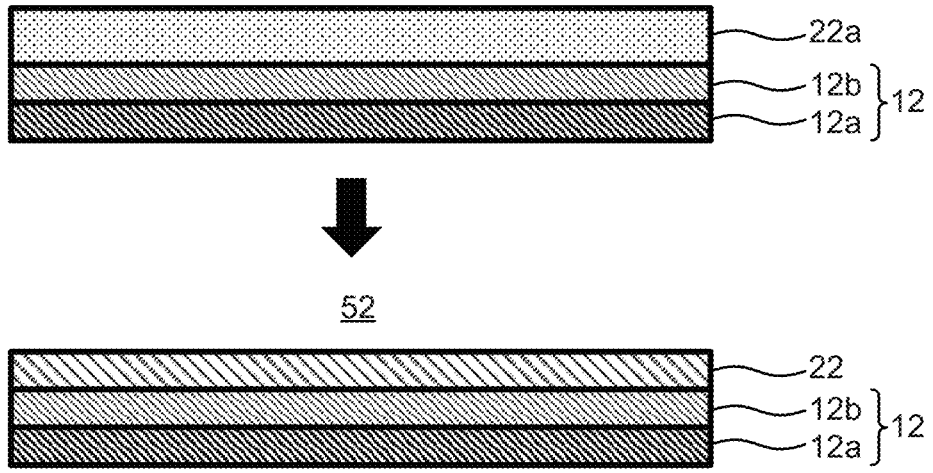
FIG. 5C schematically shows the flow of step S3 and a configuration of the second laminate obtained by the step S3.
Figure 5D:
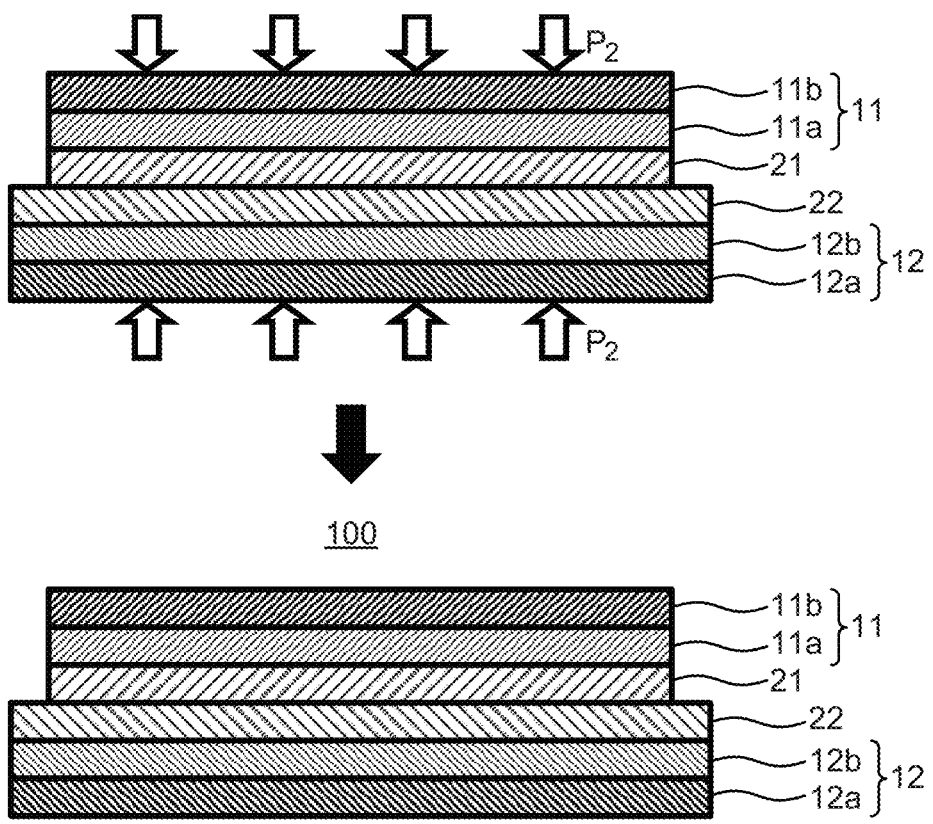
FIG. 5D schematically shows the flow of step S4 and a configuration of the all-solid-state battery obtained by the step S4.

The technique of the present disclosure also has an aspect as a manufacturing method for an all-solid-state battery. As shown in FIG. 4 and FIGS. 5A-D, the manufacturing method for an all-solid-state battery according to one embodiment comprises:

forming a first solid electrolyte layer 21 on a surface of a substrate 31 to obtain a transfer material 41 (step S1, refer to FIG. 5A);

laminating the transfer material 41 and a first electrode layer 11 together, then applying a pressure $P_1$ in a laminating direction, and transferring the first solid electrolyte layer 21 on the transfer material 41 to the first electrode layer 11 to obtain a first laminate 51 comprising the first electrode layer 11 and the first solid electrolyte layer 21 (step S2, refer to FIG. 5B);

coating a second electrode layer 12 with a material 22a constituting a second solid electrolyte layer 22 to obtain a second laminate 52 comprising the second electrode layer 12 and the second solid electrolyte layer 22 (step S3, refer to FIG. 5C); and laminating the first laminate 51 and the second laminate 52 together and then applying a pressure $P_2$ smaller than the pressure $P_1$ in a laminating direction to obtain an all-solid-state battery 100 comprising the first electrode layer 11, the first solid electrolyte layer 21, the second solid electrolyte layer 22, and the second electrode layer 12 in this order (step S4, refer to FIG. 5D).

2.1 Step S1

Figure 4:
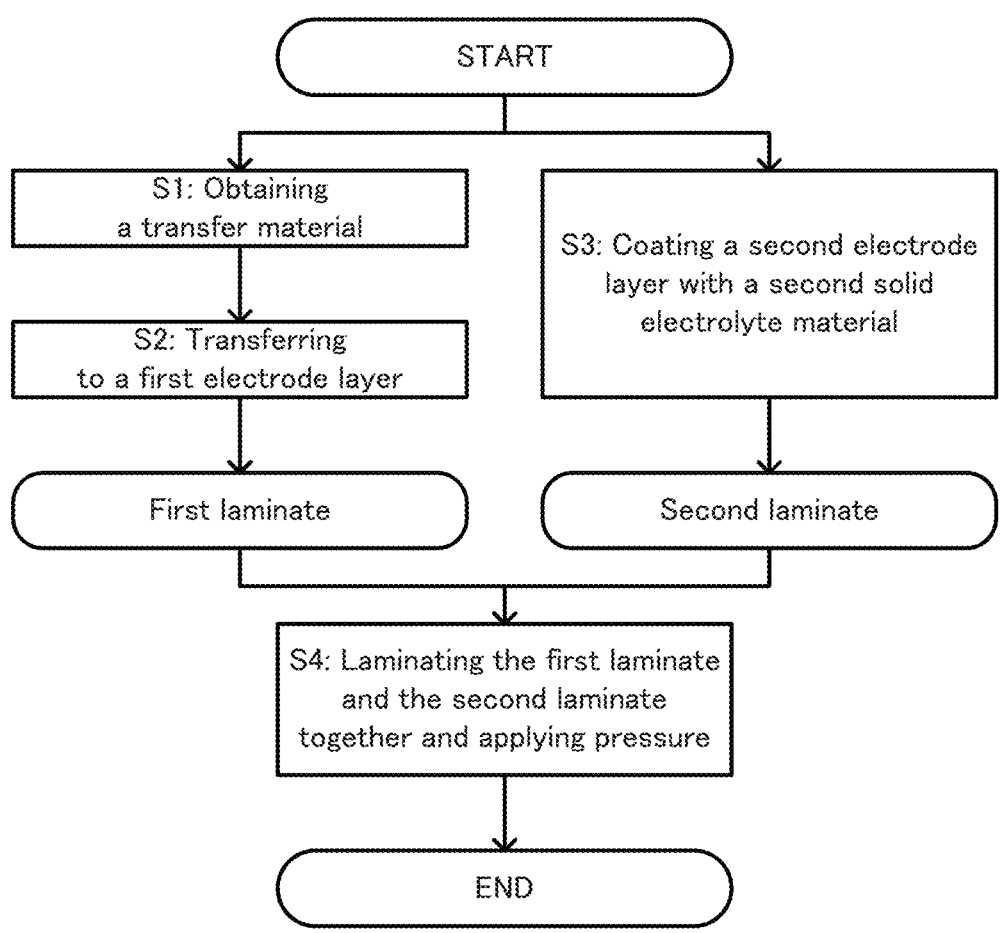
FIG. 4 shows an example of the flow of the manufacturing method for the all-solid-state battery 100.

As shown in FIG. 4 and FIG. 5A, in the step S1, the first solid electrolyte layer 21 is formed on the surface of the substrate 31 to obtain the transfer material 41.

The substrate 31 may be of any material that can be peeled off from the first solid electrolyte layer 21 after a pressure $P_1$ is applied in the step S2 described later. For example, a metal foil or a resin film can be adopted as the substrate 31.

In the step S1, the method of forming the first solid electrolyte layer 21 on the surface of the substrate 31 is not particularly limited. For example, the transfer material 41 may be obtained by coating the surface of the substrate 31 with a slurry containing a material constituting the first solid electrolyte layer 21 and then drying the slurry. Alternatively, the transfer material 41 may be obtained by dry-molding a material constituting the first solid electrolyte layer 21 together with the substrate 31.

2.2 Step S2

As shown in FIG. 4 and FIG. 5B, in the step S2, the transfer material 41 and the first electrode layer 11 are laminated together and a pressure $P_1$ is then applied in a laminating direction.

The first electrode layer 11 may comprise an active material layer 11a and a current collector layer 11b, as described above. In this case, for example, the first electrode layer 11 may be obtained by coating the surface of the current collector layer 11b with a slurry containing a material constituting the active material layer 11a and then drying the slurry. Alternatively, the first electrode layer 11 may be obtained by dry-molding a material constituting the active material layer 11a together with the current collector layer 11b.

In the step S2, for example, the first solid electrolyte layer 21 of the transfer material 41 and the active material layer 11a of the first electrode layer 11 are stacked and laminated together, and a pressure $P_1$ is applied in a laminating direction to bring the first solid electrolyte layer 21 and the active material layer 11a into close contact with each other at an interface therebetween. The pressure $P_1$ may be a pressure that can plastically deform the solid electrolyte contained in the first solid electrolyte layer 21. Specifically, the pressure $P_1$ may be more than 100 MPa, 200 MPa or more, 300 MPa or more, 400 MPa or more, 500 MPa or more, or 600 MPa or more. The upper limit of the pressure $P_1$ is not particularly limited as long as the pressure does not damage each layer. The method of applying pressure in the step S2 is not particularly limited, and various methods of applying pressure such as CIP, HIP, roll pressing, uniaxial pressing, or die pressing can be adopted.

In the step S2 and the step S4 described later, "applying pressure in a laminating direction" means applying a pressure $P_1$ or a pressure $P_2$ at least in a laminating direction, and may include a pressure in a direction other than a laminating direction together with the pressure $P_1$ or the pressure $P_2$ in a laminating direction.

In the step S2, after the transfer material 41 and the first electrode layer 1 are laminated together and a pressure is applied as described above, the substrate 31 is removed by peeling off from the transfer material 41 to obtain the first laminate 51 comprising the first electrode layer 11 and the first solid electrolyte layer 21.

2.3 Step S3

As shown in FIG. 4 and FIG. 5C, in the step S3, the second electrode layer 12 is coated with a material 22a constituting the second solid electrolyte layer 22 to obtain a second laminate 52 comprising the second electrode layer 12 and the second solid electrolyte layer 22.

The second electrode layer 12 may comprise an active material layer 12a and a current collector layer 12b, as described above. In this case, for example, the second electrode layer 12 may be obtained by coating the surface of the current collector layer 12b with a slurry containing a material constituting the active material layer 12a and then drying the slurry. Alternatively, the second electrode layer 12 may be obtained by dry-molding a material constituting the active material layer 12a together with the current collector layer 12b. More specifically, the second electrode layer 12 may be obtained by affixing a metallic lithium foil as the active material layer 12a on a surface of a metal foil as the current collector layer 12b.

In the step S3, the second laminate 52 is obtained by, for example, coating the surface of the active material layer 12a of the second electrode layer 12 with a slurry containing a material constituting the second solid electrolyte layer 22 and then drying the slurry. In the step S3, a pressure may or may not be applied to the second laminate 52. When a pressure is applied, the applied pressure is smaller than the pressure $P_1$ above. Particularly, when a layer containing metallic lithium as the active material layer 12a is adopted, since the metallic lithium is soft, there is a risk of the metallic lithium excessively permeating into the internal portion of the second solid electrolyte layer 22 when a large pressure is applied to the second laminate 52. By adopting a coating method in the step S3, the second solid electrolyte layer 22 and the second electrode layer 12 can be brought into close contact with each other in the second laminate 52 without applying a pressure to the second laminate 52, and the ratio $Rz_3/Rz_4$ or $Rz_4/Rz_3$, as described above, can be easily achieved after carrying out the step S4 described later.

By adopting a coating method to obtain the second laminate 52, and not applying a pressure or applying a pressure smaller than the pressure $P_1$ to the second laminate 52 in the step S3, an unevenness from the solid electrolyte particles easily remains on the second surface 22x of the second solid electrolyte layer 22. That is, the maximum height $Rz_2$ of the second surface 22x is likely to be large, and the ratio $Rz_1/Rz_2$ described above is easily satisfied.

In contrast, when a transfer material such as that in the steps S1 and S2 is adopted in the step S3, the maximum height $Rz_2$ of the second surface 22x of the second solid electrolyte layer 22 is equivalent to the maximum height $Rz_1$ of the first surface 21x of the first solid electrolyte layer 21, and it is difficult to satisfy the ratio $Rz_1/Rz_2$ described above. Further, when the active material layer 12a of the second electrode layer 12 contains the soft metallic lithium, transferring the second solid electrolyte layer 22 to the surface of the active material layer 12a is difficult in the first place.

2.4 Step S4

As shown in FIG. 4 and FIG. 5D, in the step S4, the first laminate 51 and the second laminate 52 are laminated together and a pressure $P_2$ smaller than the pressure $P_1$ is then applied in a laminating direction to obtain an all-solid-state battery 100 comprising the first electrode layer 11, the first solid electrolyte layer 21, the second solid electrolyte layer 22, and the second electrode layer 12 in this order.

In the step S4, it is not necessary for the first laminate 51 and the second laminate 52 to be joined together, and the pressure may be applied to the extent that the first laminate 51 and the second laminate 52 are brought into moderate contact with each other. As described above, when metallic lithium is adopted as the active material in the electrode layer, there is a concern of the metallic lithium being unnecessarily deformed by the excessive application of pressure, permeating into the solid electrolyte layer, and causing a short circuit. Further, the unevenness of the surface of the second surface 22x of the second solid electrolyte layer 22 is eliminated by the excessive application of pressure, and it is difficult to satisfy the ratio $Rz_1/Rz_2$ as described above. In this regard, it is important that the pressure $P_2$ in the step S4 should be smaller than the pressure $P_1$ in the step S2. Specifically, the pressure $P_2$ may be less than 200 MPa, 180 MPa or less, 150 MPa or less, 120 MPa or less, or 100 MPa or less. The lower limit of the pressure $P_2$ is not particularly limited as long as the pressure sufficiently ensures contact at the interface of the cell material. The method of applying pressure in the step S4 is not particularly limited, and various methods of applying pressure such as CIP, HIP, roll pressing, uniaxial pressing, or die pressing can be adopted.

2.5 Other Steps

The manufacturing method for an all-solid-state battery may comprise a step of housing the all-solid-state battery obtained as described above inside an outer packaging and a step of attaching members necessary for a battery, such as a terminal. Description of any obvious step in the manufacturing method for an all-solid-state battery is omitted.

EXAMPLES

Hereinafter, the technique of the present disclosure will be described in detail with reference to the Examples. However, the technique of the present disclosure is not limited to the following Examples.

1. Comparative Example 1

1.1 Production of Positive Electrode Mixture 1.05 g of sulfur (S), 0.852 g of $P_2S_5$, and 0.57 g of VGCF were used as starting materials constituting a positive electrode mixture, and the starting materials were compounded by mechanical milling. Specifically, the above starting materials were weighed inside a glovebox having a dew point temperature of −70° C. or lower and then kneaded in an agate mortar for 15 min. A pot (45 mL, made of $ZrO_2$) preliminarily dried at 60° C. and zirconia balls (φ4 mm, about 96 g, count of about 500) were prepared. The kneaded powder was placed in the pot with the zirconia balls, and a process of mechanical milling at 500 rpm for 1 h, pausing for 15 min, mechanical milling in reverse rotation at 500 rpm for 1 h, and pausing for 15 min was repeated for 48 h to obtain the positive electrode mixture.

1.2 Production of First Electrode Layer

A mesitylene solution containing 5% by mass of SBR and mesitylene were charged in a container made of polypropylene and mixed for 3 min by a shaker. The positive electrode mixture ($S_8$—$P_2S_5$/C) was charged in the container, and then mixed for 3 min by a shaker and for 30 s by an ultrasonic disperser, each repeated twice. Subsequently, with a positive electrode mixture slurry obtained immediately after mixing for 5 s by the ultrasonic disperser was coated an Al foil as the positive current collector layer using a doctor blade having a coating gap of 250 μm. After visually confirming that the surface coated with the positive electrode mixture was dried, the surface was further dried on a hot plate at 100° C. for 30 min to obtain a positive electrode layer as a first electrode layer.

1.3 Production of First Solid Electrolyte Layer

A heptane solution containing 5% by mass of ABR, heptane, and butyl butyrate were charged in a container made of polypropylene and mixed for 3 min by a shaker. A sulfide solid electrolyte (LiI—LiBr—$Li_2S$—$P_2S_5$-based solid electrolyte, D50=0.5 μm) was charged in the container, and then mixed for 3 min by a shaker and for 30 s by an ultrasonic disperser, each repeated twice. Subsequently, with a solid electrolyte slurry obtained immediately after mixing for 5 s by the ultrasonic disperser was coated an Al foil as the substrate using an applicator having a coating gap of 350 μm. After visually confirming that the surface coated with the solid electrolyte was dried, the surface was further dried on a hot plate at 165° C. for 30 min to obtain a transfer material consisting of the substrate and a solid electrolyte layer. The amount of ABR contained in the solid electrolyte layer was 0.6% by mass.

1.4 Production of Second Solid Electrolyte Layer

A transfer material composed of a substrate and a solid electrolyte layer was obtained by the same method as in the production of the first solid electrolyte layer. The amount of ABR contained in the solid electrolyte layer was 0.6% by mass.

1.5 Production of All-Solid-State Battery

The transfer material was stacked on the surface of the positive electrode layer and pressed at 600 MPa. The substrate was then peeled off from the transfer material to transfer the first solid electrolyte layer to the surface of the positive electrode layer, and a first laminate comprising a positive current collector layer, a positive electrode active material layer, and a first solid electrolyte layer in this order was obtained. Subsequently, a new transfer material was stacked on the surface of the first solid electrolyte layer of the first laminate and pressed at 600 MPa. The substrate was then peeled off from the transfer material, and a second laminate comprising a positive current collector layer, a positive electrode active material layer, a first solid electrolyte layer, and a second solid electrolyte layer in this order was obtained. Thereafter, a metallic lithium foil as a negative electrode active material layer and an Ni foil as a negative current collector layer were laminated together on the surface of the second solid electrolyte layer of the second laminate and pressed at 100 MPa to obtain an all-solid-state battery comprising the positive current collector layer, the positive electrode active material layer, the first solid electrolyte layer, the second solid electrolyte layer, the negative electrode active material layer, and the negative current collector layer in this order. The all-solid-state battery thus obtained was sealed in a laminate film and restrained at 10 MPa in a laminating direction for evaluation.

2. Comparative Example 2

Except that the amounts of ABR contained in the first solid electrolyte layer and the second electrolyte layer were set to 10% by mass, the all-solid-state battery was produced in the same manner as in Comparative Example 1.

3. Comparative Example 3

Except that the amount of ABR contained in the first solid electrolyte layer was set to 0.6% by mass and the amount of ABR contained in the second solid electrolyte layer was set to 10% by mass, the all-solid-state battery was produced in the same manner as in Comparative Example 1.

4. Example 1

4.1 Production of First Laminate

A positive electrode layer as the first electrode layer and a transfer material of the first solid electrolyte layer were produced in the same manner as in Comparative Example 1. Thereafter, the transfer material was stacked on the surface of the positive electrode layer and pressed at 600 MPa. The substrate was then peeled off from the transfer material to transfer the first solid electrolyte layer to the surface of the positive electrode layer, and a first laminate comprising a positive current collector layer, a positive electrode active material layer, and a first solid electrolyte layer in this order was obtained.

4.2 Production of Second Laminate

A Li foil (thickness of 70 μm) was affixed to the surface of a Ni foil as a negative current collector layer to obtain a negative electrode layer as a second electrode layer. A heptane solution containing 5% by mass of ABR, heptane, and butyl butyrate were charged in a container made of polypropylene and mixed for 3 min by a shaker. A sulfide solid electrolyte (LiI—LiBr—Li$_2$S—P$_2$S$_5$-based solid electrolyte, D50=0.5 μm) was charged in the container, and then mixed for 3 min by a shaker and for 30 s by an ultrasonic disperser, each repeated twice. Subsequently, with a solid electrolyte slurry obtained immediately after mixing for 5 s by the ultrasonic disperser was coated a Li foil of a negative electrode layer using an applicator having a coating gap of 350 μm. After visually confirming that the surface coated with the solid electrolyte was dried, the surface was further dried on a hot plate at 165° C. for 30 min to obtain a second laminate comprising a second solid electrolyte layer and a negative electrode layer as the second electrode layer. The amount of ABR contained in the solid electrolyte layer was 0.6% by mass.

4.3 Production of All-Solid-State Battery

The first laminate and the second laminate were laminated and pressed together at 100 MPa to obtain an all-solid-state battery comprising the positive current collector layer, the positive electrode active material layer, the first solid electrolyte layer, the second solid electrolyte layer, the negative electrode active material layer, and the negative current collector layer in this order. The all-solid-state battery thus obtained was sealed in a laminate film and restrained at 10 MPa in a laminating direction for evaluation.

5. Example 2

Except that the amounts of ABR contained in the first solid electrolyte layer and the second solid electrolyte layer were set to 10% by mass, the all-solid-state battery was produced in the same manner as in Example 1.

6. Example 3

Except that the amount of ABR contained in the first solid electrolyte layer was set to 0.6% by mass and the amount of ABR contained in the second solid electrolyte layer was set to 10% by mass, the all-solid-state battery was produced in the same manner as in Example 1.

7. Example 4

Except that a Li—Mg alloy foil was used in place of the Li foil as the negative electrode active material layer, the all-solid-state battery was produced in the same manner as in Example 3.

8. Evaluation Method of All-Solid-State Battery 8.1 Measurement of Surface Roughness The maximum height Rz of the surface of each layer at the interface between the first solid electrolyte layer and the second solid electrolyte layer was measured for each of the all-solid-state battery according to the Examples and Comparative Examples. The measurement method of Rz is as described above. The results are shown in Table 1 below.

8.2 Short-Circuit Resistance

The all-solid-state battery was placed and heat homogenized in an isothermal bath at 60° C. for 3 h. Thereafter, discharging and charging were carried out at a current density of 0.46 mA/cm$^2$. The cut-off voltage was 1.5 to 3.1 V. For each of the all-solid-state batteries according to the Examples and Comparative Examples, the maximum charge capacity obtained before a short circuit was measured, and this capacity was used as the "short-circuit resistance capacity" to evaluate the short-circuit resistance of the all-solid-state battery. The larger the short-circuit resistance capacity, the more superior the short-circuit resistance. The results are shown in Table 1 below.

TABLE 1

|  | First solid electrolyte layer | | Second solid electrolyte layer | | | | | | Short-circuit resistance capacity [mAh] |
|---|---|---|---|---|---|---|---|---|---|
|  | Binder amount [% by mass] | Production method | Binder amount [% by mass] | Production method | Rz$_1$ [μm] | Rz$_2$ [μm] | Rz$_1$/Rz$_2$ | Negative electrode |  |
| Comparative Example 1 | 0.6 | Transfer | 0.6 | Transfer | 0.3 | 0.3 | 1.00 | Li | 0.1 |
| Comparative Example 2 | 10 | Transfer | 10 | Transfer | 0.5 | 0.5 | 1.00 | Li | 3.3 |
| Comparative Example 3 | 0.6 | Transfer | 10 | Transfer | 0.3 | 0.5 | 0.60 | Li | 3.4 |
| Example 1 | 0.6 | Transfer | 0.6 | Coating | 0.3 | 1.5 | 0.20 | Li | 2.0 |
| Example 2 | 10 | Transfer | 10 | Coating | 0.5 | 2.0 | 0.25 | Li | 3.9 |
| Example 3 | 0.6 | Transfer | 10 | Coating | 0.3 | 2.0 | 0.15 | Li | 4.8 |
| Example 4 | 0.6 | Transfer | 10 | Coating | 0.3 | 2.0 | 0.15 | Li—Mg | 4.9 |

9. Evaluation Results

In Table 1, comparisons can be made between Comparative Example 1 and Example 1, between Comparative Example 2 and Example 2, and between Comparative Example 3 and Example 3, based on the amount of binder. Example 4 is considered to be a variation of Example 3. As it is clear from the results shown in Table 1, at the interface between the first solid electrolyte layer and the second solid electrolyte layer, it was found that the all-solid-state battery has excellent short-circuit resistance when the ratio Rz$_1$/Rz$_2$ between the maximum height Rz$_1$ of the surface of the first solid electrolyte layer and the maximum height Rz$_2$ of the surface of the second solid electrolyte layer is within the range of 0.15 or greater and 0.25 or less (Examples 1 to 4). In contrast, it was found that the short-circuit resistance of the all-solid-state battery decreases as the ratio Rz$_1$/Rz$_2$ approaches 1.00 (Comparative Examples 1 to 3). It is considered to be due to the following mechanism.

When the ratio Rz$_1$/Rz$_2$ is excessively small, the difference in surface roughness between the first solid electrolyte layer and the second solid electrolyte layer is excessively large. Thus, it is considered that a large number of voids or gaps easily form between the first solid electrolyte layer and the second solid electrolyte layer, whereby it is difficult to secure sufficient ionic conduction paths between the first solid electrolyte layer and the second solid electrolyte layer. Therefore, sufficient capacity as a battery cannot be secured. In Examples 1 to 4, since the ratio $Rz_1/Rz_2$ is 0.15 or greater, it is considered that the necessary ionic conduction paths between the first solid electrolyte layer and the second solid electrolyte layer were secured, and thus sufficient capacity was secured.

On the other hand, when the ratio $Rz_1/Rz_2$ is near 1.00, the unevenness of the surface of the first solid electrolyte layer and the unevenness of the surface of the second solid electrolyte layer are engaged with each other, and the contact area between the first solid electrolyte layer and the second solid electrolyte layer is large. Thus, it is considered that, although ionic conduction paths are easily secured, the first solid electrolyte layer and the second solid electrolyte layer easily conform to each other, whereby, when cracks are generated in one of the first solid electrolyte layer and the second solid electrolyte layer, the cracks easily propagate to the other layer. In Comparative Examples 1 to 3, it is considered that the short-circuit resistance capacity of the all-solid-state battery was reduced due to propagation of the cracks. In contrast, in Examples 1 to 4, since the ratio $Rz_1/Rz_2$ is 0.25 or less, it is considered that the propagation of cracks in a solid electrolyte layer was suppressed, and thus the short-circuit resistance capacity of the all-solid-state battery was increased.

10. Supplementary

The present inventor has also confirmed the following by experimentation. When the first laminate and the second laminate are both produced by a coating method, and then the first laminate and the second laminate are stacked and pressed at 100 MPa, in addition to the ratio $Rz_1/Rz_2$ at the interface between the first solid electrolyte layer and the second solid electrolyte layer approaching 1.00, it is difficult to secure ionic conduction paths at the interface between the positive electrode layer and the first solid electrolyte layer, leading to a small maximum capacity as a battery. As a result, the short-circuit resistance capacity is small. In this regard, there is merit in producing one of the first laminate and the second laminate by a transfer method.

When metallic lithium is used as the negative electrode active material, it is difficult to transfer the solid electrolyte layer to the surface of the negative electrode active material layer containing the metallic lithium because high pressing pressure cannot be applied to the soft metallic lithium. Even if the solid electrolyte layer can be transferred to the surface of the negative electrode active material layer under light pressure, there is a concern of poor contact between the negative electrode active material layer and the solid electrolyte layer, leading to the growth of dendrites during charging and discharging of the battery. By coating the surface of the negative electrode active material layer containing metallic lithium with a solid electrolyte material, the contactability between the negative electrode active material layer and the solid electrolyte layer is increased, and the growth of dendrites due to poor contact is easily suppressed. In this regard, there is merit in producing one of the first laminate and the second laminate (particularly, the second laminate containing metallic lithium as the negative electrode active material) by a coating method.

When the first laminate and the second laminate are laminated together and a pressure is applied, if the pressure is excessively high, unnecessary deformation of the metallic lithium as the negative electrode active material and permeation of the metallic lithium into the solid electrolyte layer occur and the unevenness at the interface between the first solid electrolyte layer and the second solid electrolyte layer is eliminated, as the ratio $Rz_1/Rz_2$ approaches 1.00. As a result, it is difficult to secure a sufficient short-circuit resistance capacity in the all-solid-state battery. In this regard, when the first laminate and the second laminate are laminated together and a pressure $P_2$ is applied, there is merit in the pressure $P_2$ being smaller than the pressure $P_1$ applied when obtaining the first laminate.

Although the case in which a lithium-sulfur battery is adopted as the all-solid-state battery is described in the above Examples and Comparative Examples, it is considered that the short-circuit resistance of the all-solid-state battery can be improved when the technique of the present disclosure is applied to all-solid-state batteries other than the lithium-sulfur battery. While the technique of the present disclosure focuses on the state of the interface between the first solid electrolyte layer and the second solid electrolyte layer, the first electrode layer and the second electrode layer can be freely changed. For example, an active material other than sulfur may be adopted as the positive electrode active material, and an active material other than metallic lithium (pure lithium and lithium alloys) may be adopted as the negative electrode active material. However, when sulfur is used as the positive electrode active material, it is considered that the amount of expansion and contraction of the sulfur during charging and discharging of the battery is large. So, stress accompanying the expansion and contraction easily accumulates between the positive electrode active material layer and the solid electrolyte layer and is not relieved, whereby cracks are easily generated in the positive electrode active material layer, and thus, a high effect of suppressing the propagation of cracks in the solid electrolyte layer according to the technique of the present disclosure can be expected. Further, it is considered that the technique of the present disclosure can also be applied to solve specific problems (such as softness and the inability to transfer a solid electrolyte layer) that occur when metallic lithium is used as the negative electrode active material.

Each of the above Examples and Comparative Examples embodies an all-solid-state battery comprising a positive electrode layer as the first electrode layer and a negative electrode layer as the second electrode layer. However, it is considered that the technique of the present disclosure demonstrates the same effect when applied to an all-solid-state battery comprising a negative electrode layer as the first electrode layer and a positive electrode layer as the second electrode layer.

From the results of the above Examples and Comparative Examples, it is considered that an all-solid-state battery having the following features (1) and (2) is less likely to have cracks propagate in the solid electrolyte layer and has excellent short-circuit resistance.

(1) A first electrode layer, a first solid electrolyte layer, a second solid electrolyte layer, and a second electrode layer are contained in this order.
(2) The first solid electrolyte layer has a first surface, the second solid electrolyte layer has a second surface in contact with the first surface, and a maximum height $Rz_1$ of the first surface and a maximum height $Rz_2$ of the second surface satisfy the relation of $0.15 \leq Rz_1/Rz_2 \leq 0.25$.

It was found that an all-solid-state battery having the above features can be easily manufactured by the manufacturing method comprising the following steps S1 to S4. The steps S1 to S3 are not restricted to the order below.

(S1) forming a first solid electrolyte layer on a surface of a substrate to obtain a transfer material.

(S2) laminating the transfer material and a first electrode layer together, then applying a pressure $P_1$ in a laminating direction, and transferring the first solid electrolyte layer on the transfer material to the first electrode layer to obtain a first laminate comprising the first electrode layer and the first solid electrolyte layer.

(S3) coating a second electrode layer with a material constituting a second solid electrolyte layer to obtain a second laminate comprising the second electrode layer and the second solid electrolyte layer.

(S4) laminating the first laminate and the second laminate together and then applying a pressure $P_2$ smaller than the pressure $P_1$ in a laminating direction to obtain an all-solid-state battery comprising the first electrode layer, the first solid electrolyte layer, the second solid electrolyte layer, and the second electrode layer in this order.

REFERENCE SIGNS LIST

11 first electrode layer
12 second electrode layer
21 first solid electrolyte layer
22 second solid electrolyte layer
31 substrate
41 transfer material
51 first laminate
52 second laminate
100 all-solid-state battery

The invention claimed is:

1. An all-solid-state battery, comprising a first electrode layer, a first solid electrolyte layer, a second solid electrolyte layer, and a second electrode layer in this order, wherein the first solid electrolyte layer has a first surface, the second solid electrolyte layer has a second surface in contact with the first surface, and the second solid electrolyte layer has a third surface on an opposite side of the second surface, the first solid electrolyte layer has a fifth surface on the opposite side of the first surface, and the first electrode layer has a sixth surface in contact with the fifth surface, wherein a maximum height $Rz_1$ of the first surface and a maximum height $Rz_2$ of the second surface satisfy a relation (1) below: $0.15 < Rz_1/Rz_2 < 0.25$ ... (1) the second electrode layer has a fourth surface in contact with the third surface, and a maximum height Rz3 of the third surface and a maximum height Rz4 of the fourth surface satisfy a relation (2) or (3) below: $0.45 < Rz_3/Rz_4 < 1.00$ ... (2) $0.45 < Rz_4/Rz_3 < 1.00$ ... (3) a maximum height $Rz_5$ of the fifth surface and a maximum height $Rz_6$ of the sixth surface satisfy the following relation (4) or (5) below $0.45 < Rz_5/Rz_6 < 1.00$ ... (4) $0.45 < Rz_6/Rz_5 < 1.00$ ... (5), and wherein the first electrode layer comprises a positive electrode active material layer, the second electrode layer comprises a negative electrode active material layer, the negative electrode active material layer contains metallic lithium as a negative electrode active material, and the positive electrode active material layer contains sulfur as a positive electrode active material.

2. A manufacturing method for manufacturing an all-solid-state battery according to claim 1, the method comprising:

forming a first solid electrolyte layer on a surface of a substrate to obtain a transfer material;

laminating the transfer material and a first electrode layer together, then applying a pressure P1 in a laminating direction, and transferring the first solid electrolyte layer on the transfer material to the first electrode layer to obtain a first laminate comprising the first electrode layer and the first solid electrolyte layer;

coating a second electrode layer with a material constituting a second solid electrolyte layer to obtain a second laminate comprising the second electrode layer and the second solid electrolyte layer; and laminating the first laminate and the second laminate together and then applying a pressure P2 smaller than the pressure P1 in a laminating direction to obtain an all-solid-state battery comprising the first electrode layer, the first solid electrolyte layer, the second solid electrolyte layer, and the second electrode layer in this order.

* * * * *